United States Patent
Park

(10) Patent No.: US 8,619,640 B2
(45) Date of Patent: Dec. 31, 2013

(54) DYNAMIC BANDWIDTH CONTROL IN INTERFERENCE SITUATIONS

(75) Inventor: Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 12/969,771

(22) Filed: Dec. 16, 2010

(65) Prior Publication Data

US 2012/0155294 A1    Jun. 21, 2012

(51) Int. Cl.
*H04J 1/16* (2006.01)
*H04L 12/28* (2006.01)

(52) U.S. Cl.
USPC ........... 370/278; 370/252; 370/282; 370/230; 370/430

(58) Field of Classification Search
USPC ......... 370/229, 230–240, 242–246, 248–250, 370/252, 270, 276–278, 280–282, 302, 310, 370/310.1, 312, 317–322, 326–336, 341, 370/343, 346, 348, 379, 432–433, 442, 450, 370/454–456, 462, 480, 492, 430; 455/3.03, 9, 67.13, 67.11, 69, 447, 455/450–455, 463–464, 507, 509–514; 714/39, 47, 47.1, 699, 786, 799, 809, 714/811, 814, 815, 817; 371/16.3, 4
See application file for complete search history.

(56) References Cited

U.S. PATENT DOCUMENTS

| | | | | |
|---|---|---|---|---|
| 5,497,508 | A * | 3/1996 | George | 455/161.2 |
| 5,825,757 | A * | 10/1998 | Tat et al. | 370/330 |
| 6,088,590 | A * | 7/2000 | Anderson et al. | 455/437 |
| 7,002,910 | B2 * | 2/2006 | Garcia-Luna-Aceves et al. | 370/229 |
| 7,376,118 | B2 * | 5/2008 | Osterloh et al. | 370/344 |
| 7,933,344 | B2 * | 4/2011 | Hassan et al. | 375/260 |
| 7,944,882 | B2 * | 5/2011 | Stephens | 370/330 |
| 8,363,623 | B2 * | 1/2013 | Larsen | 370/334 |
| 8,395,997 | B2 * | 3/2013 | Banerjea et al. | 370/241 |
| 2004/0037240 | A1 * | 2/2004 | Gautney et al. | 370/329 |
| 2004/0048574 | A1 | 3/2004 | Walker et al. | |
| 2007/0248114 | A1 * | 10/2007 | Jia et al. | 370/465 |
| 2008/0043813 | A1 | 2/2008 | Azenkot et al. | |
| 2009/0296647 | A1 | 12/2009 | Friday et al. | |
| 2012/0140646 | A1 * | 6/2012 | Stephens | 370/252 |

FOREIGN PATENT DOCUMENTS

| | | |
|---|---|---|
| EP | 1739909 A1 | 1/2007 |
| WO | 2012/082313 A2 | 6/2012 |

OTHER PUBLICATIONS

Trainin, "Method Of Collision Resolution in a Wide Channel", U.S. Appl. No. 12/860,637, filed Aug. 20, 2010, 31 pages.
Park, "Channel Access Mechanism for Wide Channels Used in Overlapping Networks", U.S. Appl. No. 12/861,086, filed Aug. 23, 2010, 23 pages.

(Continued)

*Primary Examiner* — John Pezzlo
(74) *Attorney, Agent, or Firm* — Sutherland Asbill & Brennan LLP

(57) ABSTRACT

When a wireless communications device intends to communicate with another device over a wide channel consisting of multiple narrow channels, but detects interference on one or more of those narrow channels, it may restrict subsequent communications with that other device to those narrow channels that don't suffer from the interference. In one embodiment the device may simply refuse to monitor the interfering channel(s) for signals for a particular period of time. In another embodiment the device may use a CTS to signal the other device not to use the interfering narrow channel(s). That may result in using a wide channel with a reduced bandwidth for communications.

52 Claims, 4 Drawing Sheets

(56) References Cited

OTHER PUBLICATIONS

International Search Report and Written Opinion received for PCT Patent Application No. PCT/US2011/061388, mailed on Jul. 25, 2012. 9 pages.

International Preliminary Report on Patentability received for PCT Patent Application No. PCT/US2011/061388, mailed on Jun. 27, 2013, 5 pages.

* cited by examiner

DYNAMIC BANDWIDTH CONTROL IN INTERFERENCE SITUATIONS

BACKGROUND

Although earlier versions of WiFi limited channel bandwidth to 20 MHz, later improvements in wireless technology have expanded channel bandwidth, while remaining compatible with older versions, by combining multiple existing 20 MHz-wide channels into channels that have a bandwidth of 40, 80, or even 160 MHz. However, this expanded bandwidth can cause problems when networks overlap. For example, a first network controller may communicate with a first mobile device using an 80 MHz bandwidth, made up of four 20 MHz channels, thus achieving high throughput and efficiency. But that first mobile device may be near a second mobile device that is communicating with a second network controller on one or more of the same 20 MHz channels. Transmissions from the second network may be strong enough to be overheard by the first mobile device, resulting in interference to the communications between the first network controller and first mobile device. Unless the first network controller can directly hear these interfering transmissions from the second network, it has no direct way of determining why its transmissions are not being correctly received by the first mobile device.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
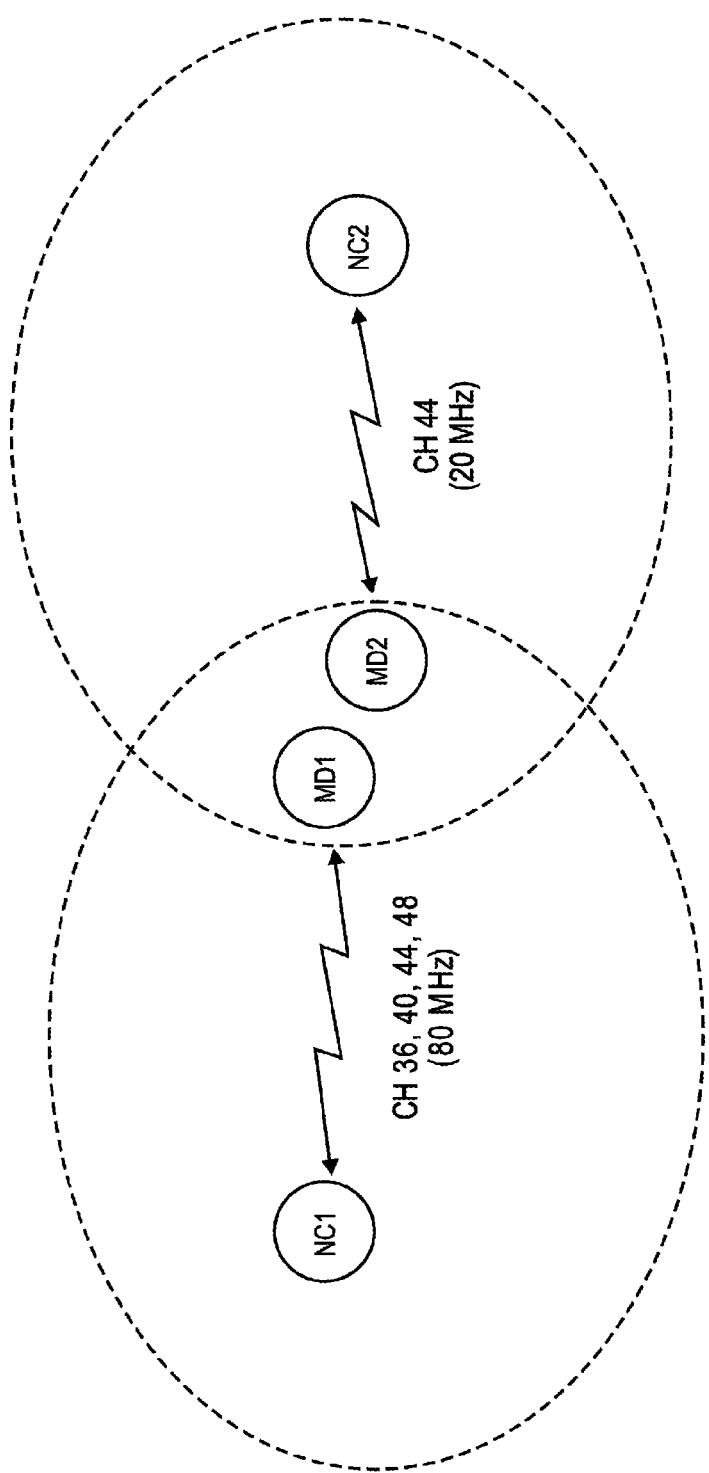
FIG. 1 shows two devices communicating with each other in a network, with potential interference from another network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a tangible non-transient computer-readable medium, which may be read and executed by one or more processors to enable performance of the operations described herein. Such a computer-readable medium may include any tangible non-transient mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid (e.g., wireless) medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used in this document, a 'narrow' channel is a channel having a pre-defined continuous bandwidth in the frequency spectrum, which will not be separated into multiple smaller sub-channels for independent communication in the network. As used in this document, a 'wide' channel is a channel having the combined portions of the frequency spectrum occupied by multiple ones of these narrow channels. That is, multiple specified narrow channels may collectively constitute a specified wide channel. In some embodiments, a wide channel contains only contiguous narrow channels, but in other embodiments these narrow channels don't have to be contiguous, i.e., two narrow channels that are included in the wide channel may be separated by one or more narrow channels that are not included in the wide channel. For simplicity of description, the narrow channels may sometimes be described as having a 20 MHz bandwidth, while the wide channels may be described as having a bandwidth that is an integer multiple of 20 MHz, but other embodiments may use narrow-channel bandwidths other than 20 MHz. Within this document, the term 'channel' by itself refers to a narrow channel unless specifically indicated by surrounding text as a wide channel.

In various embodiments, a device that would normally communicate with another device over a wide channel of a particular bandwidth may detect a signal, representing potential interference, on one or more of the narrow channels that make up that wide channel. When the device receives a Request-to-Send (RTS) indicating the wide channel, it may respond with a Clear-to-Send (CTS) indicating a wide channel with fewer narrow channels, and that excludes the potentially interfering narrow channel. When the originator of the RTS subsequently begins transmitting data, it may restrict that transmission to only the narrow channels indicated by the CTS. In this manner, the interference with that data communication may be avoided, while still retaining some of the benefits of using a wide channel. The reduced wide channel may be indicated by inserting the relevant information in a defined field in the CTS, which in some embodiments may be a field that was previously reserved in prior art versions of a CTS.

FIG. 1 shows two devices communicating with each other in a network, with potential interference from another network, according to an embodiment of the invention. In the illustrated embodiment, a network controller NC1 may be able to transmit to a mobile device MD1 in a first network, over an 80 MHz wide channel consisting of 20 MHz narrow channels #36, 40, 44, and 48. The dashed line around both NC1 and MD1 shows the approximate network coverage area for this first network. At the same time, in a second network a network controller NC2 may transmit to a second mobile device MD2 over a single 20 MHz narrow channel #44. The dashed line around NC2 and MD2 shows the approximate network coverage area for this second network. With the proliferation of wireless networks, such overlapping coverage areas have become common.

Since device MD1 can receive simultaneous signals on narrow channel 44 from both network controllers, any transmission from NC1 that involves narrow channel 44 might be received by MD1 in a garbled state, thus subjecting the entire 80 MHz wide channel to errors and the possible need for retransmissions. This unfortunate situation may be avoided by avoiding use of the interfering channel 44 in communications from NC1 to MD1. However, NC1 may be too far from NC2 to detect the interference on channel 44. Note: although network controllers and mobile devices are playing particular roles in the example of FIG. 1, the same principles may be applied to any two devices that are to communicate with each other but receive interference from another device on at least one narrow channel.

Figure 2:
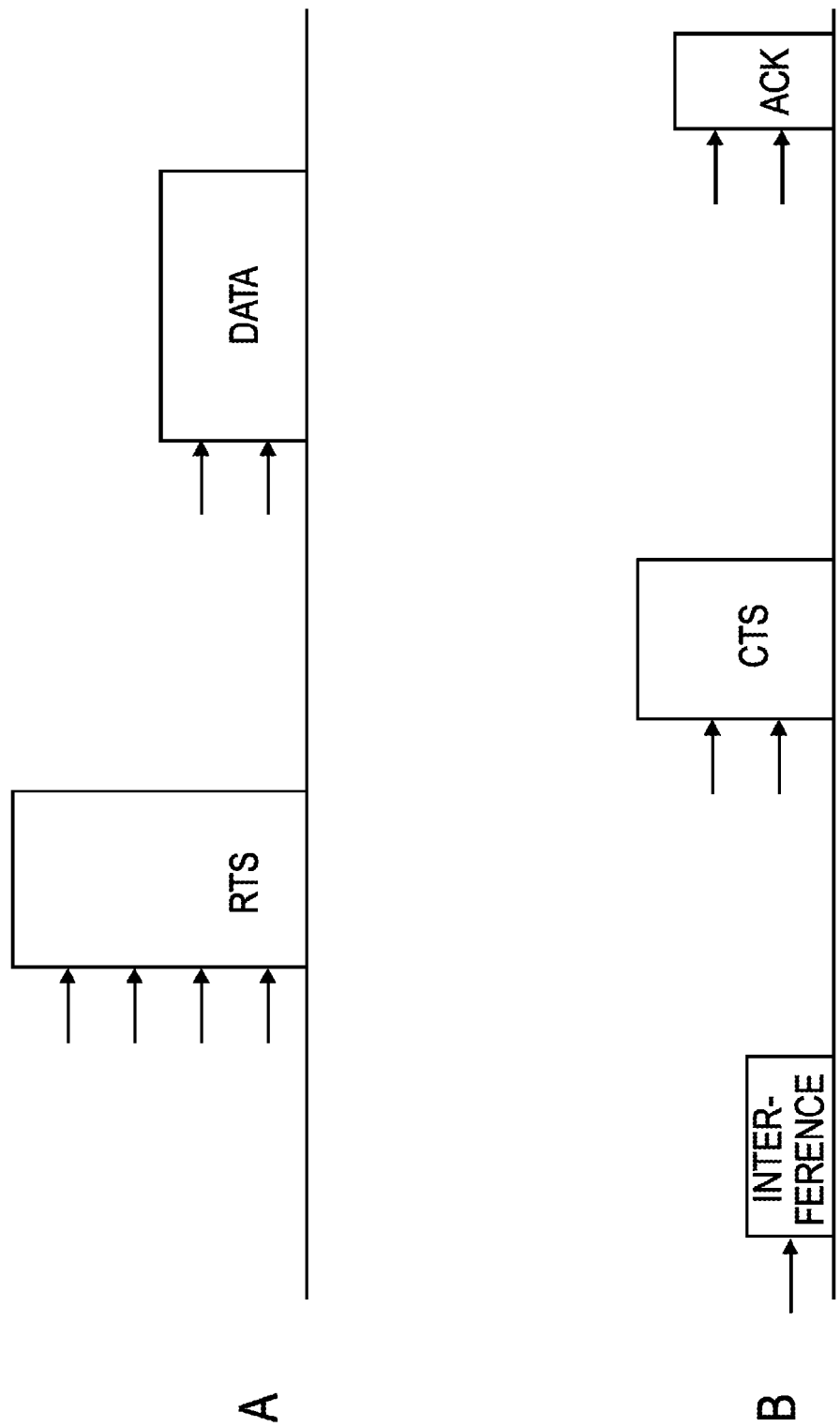
FIG. 2 shows a timing diagram of two devices exchanging an RTS/CTS and then communicating data over a resulting wide channel, according to an embodiment of the invention.

FIG. 2 shows a timing diagram of two devices exchanging an RTS/CTS and then communicating data over a resulting wide channel, according to an embodiment of the invention. In the illustrated embodiment, device B may receive a potentially interfering signal on a particular narrow channel. (The single arrow indicates a single narrow channel is involved, while two or four arrows in other parts of the diagram indicate that two or four narrow channels are involved.)

The term 'potentially interfering' indicates the signal is on a narrow channel that device B may use for communication in its own network, and that the signal level is strong enough on that narrow channel to possibly interfere with device B's communications in its own network, but such communication within its own network may not be taking place at the time the potentially interfering signal is detected. In many instances, the potentially interfering signal may have an extra-network source (i.e., the signal that does not appear to originate from any of the devices in the network to which devices A and B both belong), and may in fact come from a device belonging to another network whose coverage area overlaps that of the current network. Although this document typically describes interference on a single narrow channel, it is obvious that the description and ensuing embodiments may easily be expanded to include interference on multiple narrow channels.

Device B may monitor multiple narrow channels to determine if there are potentially interfering signals on any of those narrow channels. The particular narrow channels to be monitored in this way may be determined in various ways. For example, one or more wide channels, each with a predetermined set of narrow channels, may have been established for communications with device B. Monitoring may take any of various forms, such as but not limited to a clear channel assessment (CCA) of each narrow channel. In the example of FIG. 2, potential interference is detected only on a single narrow channel (e.g., a 20 MHz channel).

Subsequently, device A may transmit an RTS to device B, requesting communication over a wide channel (e.g., 80 MHz) that includes four narrow channels. But device B, wishing to avoid communicating over the potentially interfering channel, may transmit back a CTS indicating only two narrow channels (e.g., 40 MHz), neither of which is the potentially interfering channel. The subsequent data transmission from device A and acknowledgement from device B may then take place over the 40 MHz wide channel indicated by the CTS.

The RTS and CTS may contain the necessary channel information in any feasible form. In some embodiments, the RTS and/or CTS may be conveyed in an action frame, and the channel information contained within that action frame. In some embodiments, the channel information may be contained within a information element. Other formats may also be used.

Figure 3:
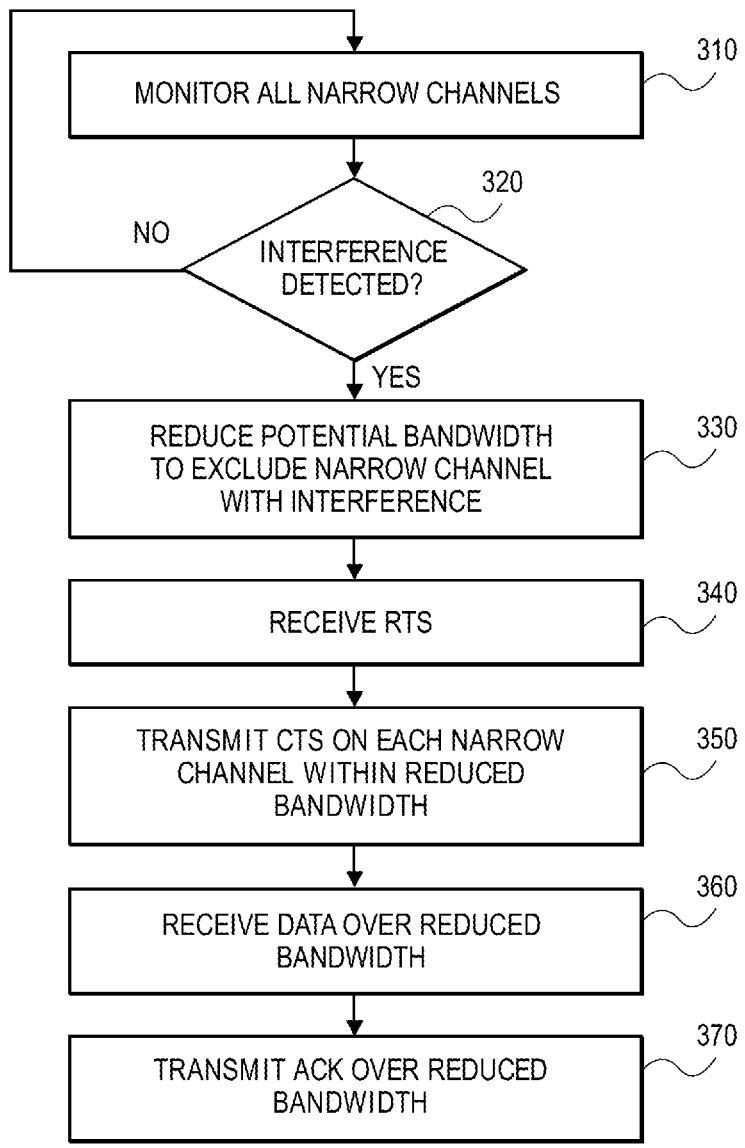
FIG. 3 shows a flow diagram of a method of establishing a set of narrow channels for a data transfer through an RTS/CTS exchange, according to an embodiment of the invention.

FIG. 3 shows a flow diagram of a method of establishing a set of narrow channels for a data transfer through an RTS/CTS exchange, according to an embodiment of the invention. At 310, the device may monitor all the narrow channels that it may potentially use in communicating with another device. For example, if it has previously been restricted to using eight specific narrow channels, each having a 20 MHz bandwidth, then it may monitor those eight narrow channels, even though several times that many may be allowed by industry standards. Monitoring may include monitoring for legitimate signals from devices within its own network and monitoring for potentially interfering signals.

As long as no potentially interfering signal is received on any of those narrow channels, the device may consider all of them to be available for a subsequent communication. But if an interfering signal is detected at 320, then at 330 the device may reduce the potential bandwidth that it intends to use for communicating so that that bandwidth excludes the potentially interfering channel. The term 'potentially interfering' is used here because the device is not yet trying to communicate, so there is no actual interference. 'Reducing' the potential bandwidth may be handled in various ways. For example, in one embodiment the device may merely exclude the potentially interfering channel from any wide channels that it might consider using. In another embodiment the device may choose from a predetermined list of wide channels that are not as wide as maximum available wide channel (for example, one or more 40 MHz wide channels might be considered when an 80 MHz channel would be available if there were no interfering narrow channels).

At 340, the device may receive an RTS that specifies a particular set of narrow channels for a subsequent communication, one of which is the potentially interfering narrow channel identified at 320. The RTS may indicate the requested set of narrow channels in various ways. In one embodiment, the RTS may be transmitted separately and in parallel on each of the requested narrow channels. In another embodiment, the RTS may contain one or more fields indicating the requested narrow channels.

The device may respond with a CTS at 350, but the CTS may indicate that the acceptable narrow channels do not include the potentially interfering channel. Thus, the CTS may indicate that the acceptable narrow channels are a subset of the narrow channels indicated in the RTS, a subset that excludes the potentially interfering narrow channel and may exclude other narrow channels as well. The CTS may indicate the acceptable narrow channels in various ways. In one embodiment, the CTS may be transmitted separately and in parallel on each of the acceptable narrow channels but not on any other narrow channel. In another embodiment, the CTS may contain one or more fields indicating the acceptable narrow channels.

Once the acceptable narrow channels have been indicated through the CTS, the device that transmitted the RTS may communicate with the device that transmitted the CTS, using no more than the channels indicated by the CTS. This is indicated by receipt of data at 360 and by transmission of an acknowledgement at 370. The actual channels used in this communication may use all the narrow channels indicated by the CTS, but sometimes may use only a portion of them. For example, in some embodiments, the requesting device (the device transmitting the RTS) may restrict subsequent communications to less than the full range of available narrow channels for reasons that don't involve interference sensed by the other device. In such an instance, the subsequent communications may be restricted to only those narrow channels that are acceptable to both devices, which may be a subset of the narrow channels indicated in the CTS.

Figure 4:
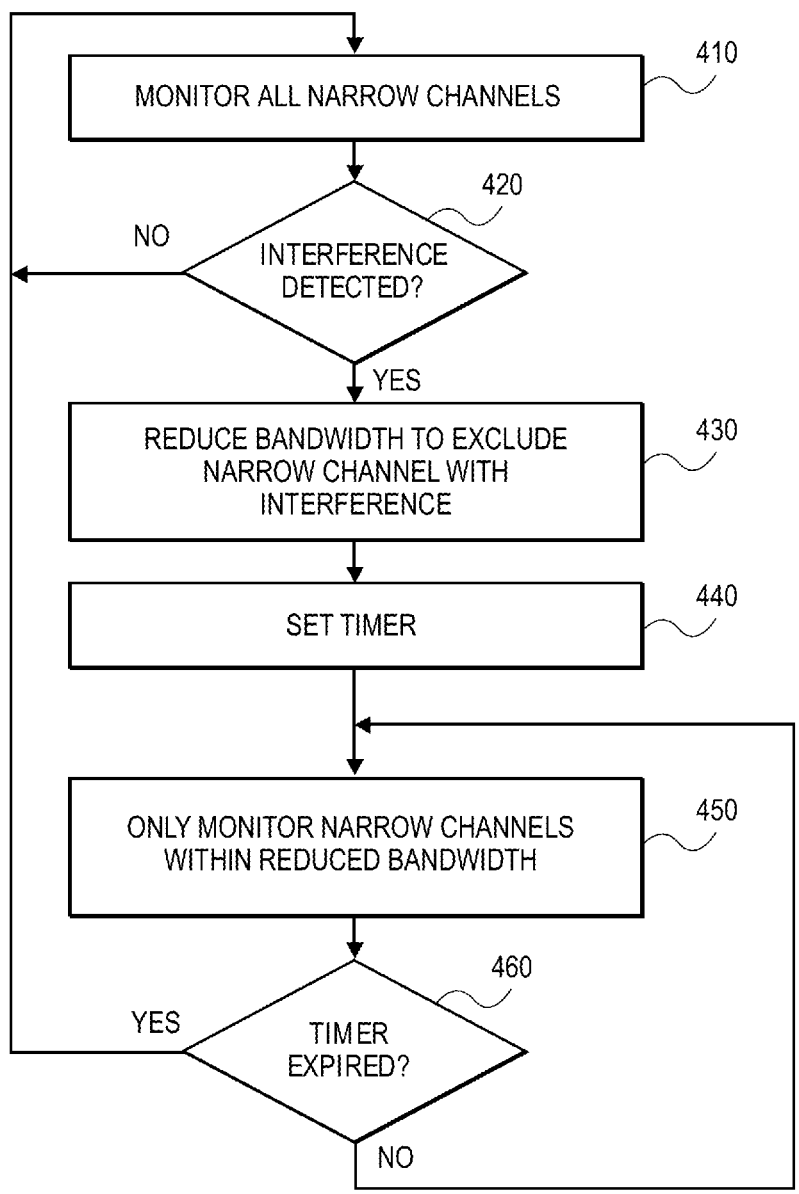
FIG. 4 shows a flow diagram of a method of reducing the monitored bandwidth, according to an embodiment of the invention.

FIG. 4 shows a flow diagram of a method of reducing the monitored bandwidth, according to an embodiment of the invention. In the illustrated embodiment, at 410 a device may monitor all relevant narrow channels. Monitoring may include monitoring for signals from within its own network and monitoring for potential interference. The 'relevant' narrow channels may be all available narrow channels specified by a standard, a communications directive, a policy decision, or similar directive, may have been specified by the network controller, or may have been specified in any other feasible way. When a potentially interfering signal is detected on one or more of the narrow channels at 420, the device may reduce the number of channels it monitors at 430 so that it no longer monitors the potentially interfering narrow channel(s).

Determining which reduced set of narrow channels to monitor now may be done in various ways, such as but not limited to: 1) excluding only the potentially interfering channel(s), 2) excluding enough channels so that the number of monitored channels is a power of 2 (2, 4, etc.), 3) monitoring the narrow channels in a pre-defined set of narrow channels (monitoring channels 36 and 40, for example), 4) monitoring narrow channels that produce a particular bandwidth (40 MHz or 80 MHz, for example), 5) etc.

Many sources of interference are temporary in nature, so at 450 the device may monitor this reduced set of narrow channels for only a predetermined maximum period of time, as measured by setting a timer at 440. The length of time measured by the timer may represent any feasible value, such as but not limited to a transmit opportunity (TXOP), a network allocation vector (NAV), or any other relevant period of time. Once the timer has expired at 460, the device may resume monitoring the full set of narrow channels at 410.

During the time that the device is only monitoring a subset of the potential narrow channels (while the timer is counting), it will only be able to receive an RTS on that subset of narrow channels, and will therefore only respond with a CTS on, at most, that subset of narrow channels. In some embodiments, this alone may assure that it will not agree to communicate with another device over more than that subset of narrow channels, and will therefore not agree to communicate over the potentially interfering narrow channel.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
   monitoring, by a device comprising one or more processors, for signals on a plurality of narrow channels of a first wide channel;
   detecting a potentially interfering signal on a particular one of the narrow channels of the first wide channel;
   transmitting a clear-to-send (CTS) to a network controller, wherein the CTS indicates a second wide channel to use for a subsequent communication, and wherein a plurality of narrow channels of the second wide channel are a subset of the plurality of narrow channels of the first wide channel and excludes the particular one of the narrow channels; and
   communicating, by the device, with the network controller via the second wide channel.

2. The method of claim 1, wherein said avoiding transmitting comprises:
   stopping said monitoring of the particular one of the narrow channel, while continuing to monitor the plurality of narrow channels of the second wide channel, for a particular period of time; and
   resuming monitoring the plurality of narrow channels of the first wide channel after expiration of the particular period of time.

3. The method of claim 2, wherein the particular period of time is selected from a list consisting of:
   a network allocation vector; and
   a transmit opportunity.

4. The method of claim 1, further comprising receiving a request-to-send (RTS), wherein the CTS is transmitted in response to the RTS, and the RTS indicates a request for a communication over at least the particular narrow channel.

5. The method of claim 1, wherein each of the plurality of narrow channels of the first wide channel has a bandwidth of 20 MHz.

6. The method of claim 1, wherein said potentially interfering signal is determined to have an extra-network source.

7. The method of claim 1, further comprising:
   receiving a request-to-send (RTS) indicating the plurality of narrow channels of the first wide channel,
   wherein the CTS is transmitted over the second wide channel.

8. An apparatus configured to:
   monitor for signals on a plurality of narrow channels of a first wide channel;

detect a potentially interfering signal on a particular one of the plurality of narrow channels of the first wide channel;

transmit a clear-to-send (CTS) to a network controller, wherein the CTS indicates a second wide channel to use for a subsequent communication, and wherein a plurality of narrow channels of the second wide channel are a subset of the plurality of narrow channels of the first wide channel and excludes the particular one of the narrow channels; and communicate with the network controller via the second wide channel.

9. The apparatus of claim 8, wherein said transmitting is to comprise:

stopping said monitoring of the particular narrow channel, while continuing to monitor said at least some others of the narrow channels, for a particular period of time; and resuming monitoring all the narrow channels after expiration of the particular period of time.

10. The apparatus of claim 9, wherein the particular period of time is to be selected from a list consisting of:

a network allocation vector; and a transmit opportunity.

11. The apparatus of claim 8, wherein:

the apparatus is further to receive a request-to-send (RTS);

the CTS is to be transmitted in response to the RTS; and the RTS is to indicate a request for a communication that includes the particular narrow channel.

12. The apparatus of claim 8, wherein each of the narrow channels is to have a bandwidth of 20 MHz.

13. The apparatus of claim 8, wherein said potentially interfering signal is to be determined to have an extra-network source.

14. The apparatus of claim 8, the apparatus to:

receive a request-to-send (RTS) indicating the plurality of narrow channels of the first wide channel, wherein the CTS is transmitted over the second wide channel.

15. A computer-readable non-transitory storage medium that contains instructions, which when executed by one or more processors result in performing operations comprising:

monitoring for signals on all narrow channels of a first wide channel;

detecting a potentially interfering signal on a particular one of the narrow channels;

transmitting a clear-to-send (CTS) to a network controller, wherein the CTS indicates a second wide channel to use for a subsequent communication, and wherein a plurality of narrow channels of the second wide channel are a subset of the plurality of narrow channels of the first wide channel and excludes the particular one of the narrow channels; and communicating, by the device, with the network controller via the second wide channel.

16. The computer-readable non-transitory storage medium of claim 15, wherein the operation of transmitting comprises:

stopping said monitoring of the particular narrow channel, while continuing to monitor said at least some others of the narrow channels, for a particular period of time; and resuming monitoring all the narrow channels after expiration of the particular period of time.

17. The computer-readable non-transitory storage medium of claim 16, wherein the particular period of time is selected from a list consisting of:

a network allocation vector; and a transmit opportunity.

18. The computer-readable non-transitory storage medium of claim 15, wherein the operations further comprise receiving a request-to-send (RTS), wherein the CTS is transmitted in response to the RTS, and the RTS indicates a request for a communication that includes the particular narrow channel.

19. The computer-readable non-transitory storage medium of claim 15, wherein each of the narrow channels has a bandwidth of 20 MHz.

20. The computer-readable non-transitory storage medium of claim 15, wherein said potentially interfering signal is determined to have an extra-network source.

21. The computer-readable non-transitory storage medium of claim 15, wherein the operations further comprise:

receiving a request-to-send (RTS) indicating the plurality of narrow channels of the first wide channel, wherein the CTS is transmitted over the second wide channel.

22. A method of communicating in a wireless communications network, comprising:

identifying that one or more of multiple channels of a first wide band are idle;

receiving a request-to-send (RTS) indicating multiple channels of the first wide band that are available for communication; and transmitting a clear-to-send (CTS) over at least some of the multiple channels that are identified as idle prior to receiving the RTS, while not transmitting the CTS over ones of the multiple channels that were not indicated as idle before the RTS.

23. An apparatus configured to:

identify that one or more of multiple channels of a first wide band are idle;

receive a request-to-send (RTS) indicating multiple channels of the first wide band that are available for communication; and transmit a clear-to-send (CTS) over at least some of the multiple channels that are identified as idle prior to receiving the RTS, while not transmitting the CTS over ones of the multiple channels that were not indicated as idle before the RTS.

24. A computer-readable non-transitory storage medium that contains instructions, which when executed by one or more processors result in performing operations comprising:

identifying that one or more of multiple channels of a first wide band are idle;

receiving a request-to-send (RTS) indicating multiple channels of the first wide band that are available for communication; and transmitting a clear-to-send (CTS) over at least some of the multiple channels that are identified as idle prior to receiving the RTS, while not transmitting the CTS over ones of the multiple channels that were not indicated as idle before the RTS.

25. A device configured to:

monitor multiple narrow channels of a wide channel to determine if there are potentially interfering signals on any of the narrow channels, the wide channel having a bandwidth of at least 80 MHz;

detect a potentially interfering signal on a particular narrow channel of the multiple narrow channels;

transmit to a second device on a reduced wide channel that includes at least some of the narrow channels of the multiple narrow channels and excludes said particular narrow channel.

26. The device of claim 25, further configured to monitor each of the narrow channels of the multiple narrow channels.

27. The device of claim 25, further configured to:
stop monitoring of the particular narrow channel of the multiple narrow channels, while continuing to monitor the at least some narrow channels, for a particular period of time; and
resume monitoring the multiple narrow channels after expiration of the particular period of time.

28. The device of claim 27, wherein the particular period of time is to be selected from a list consisting of:
a network allocation vector; and
a transmit opportunity.

29. The device of claim 25, further configured to:
receive a request-to-send (RTS) from the second device, the RTS including information regarding the wide channel; and
transmit a clear-to-send (CTS) to the second device in response to the RTS, the CTS including information regarding the reduced wide channel.

30. The device of claim 29, wherein:
the RTS is received separately and in parallel on each of the multiple narrow channels of the wide channel; and
the CTS is transmitted separately and in parallel on each of the narrow channels of the reduced wide channel.

31. The device of claim 25, wherein the wide channel includes eight 20 MHz narrow channels.

32. The device of claim 25, wherein the wide channel includes narrow channels that are not contiguous.

33. A method to communicate in a wireless network comprising:
monitoring each of multiple 20 MHz narrow channels of a wide channel to determine if there are potentially interfering signals on any of the narrow channels, the wide channel having a bandwidth of at least 80 MHz;
detecting a potentially interfering signal on a particular narrow channel of the multiple narrow channels; and
transmitting to another device on a reduced wide channel that includes at least some of the narrow channels of the multiple narrow channels and excludes said particular narrow channel.

34. The method of claim 33, further including monitoring each of the narrow channels of the multiple narrow channels.

35. The method of claim 33, further including:
stopping a monitoring of the particular narrow channel of the multiple narrow channels, while continuing to monitor the at least some narrow channels, for a particular period of time; and
resuming monitoring the multiple narrow channels after expiration of the particular period of time.

36. The method of claim 35, wherein the particular period of time is to be selected from a list consisting of:
a network allocation vector; and
a transmit opportunity.

37. The method of claim 33, further comprising:
receiving a request-to-send (RTS) from the second device, the RTS including information regarding the wide channel; and
transmitting a clear-to-send (CTS) to the second device in response to the RTS, the CTS including information regarding the reduced wide channel.

38. The method of claim 37, wherein:
the RTS is received separately and in parallel on each of the multiple narrow channels of the wide channel; and
the CTS is transmitted separately and in parallel on each of the narrow channels of the reduced wide channel.

39. The method of claim 33, wherein the wide channel includes eight 20 MHz narrow channels.

40. The method of claim 33, wherein the first plurality of narrow channels are not contiguous.

41. A device configured to:
send a request-to-send (RTS) to a second device, the RTS indicating a wide channel including a first plurality of narrow channels, the wide channel having a bandwidth of at least 80 MHz;
receive a clear-to-send (CTS) from the second device in response to the RTS, the CTS indicating a reduced wide channel including a second plurality of the narrow channels, wherein the second plurality of narrow channels is a subset of the first plurality narrow channels;
communicate with the other device only on the reduced wide channel.

42. The device of claim 41, wherein the first plurality of narrow channels each have a bandwidth of 20 MHz.

43. The device of claim 41, wherein the wide channel includes eight 20 MHz narrow channels.

44. The device of claim 41, wherein the first plurality of narrow channels are not contiguous.

45. At least one computer-readable non-transitory storage medium that contains instructions, which when executed by one or more processors result in performing operations comprising:
monitoring multiple narrow channels of a wide channel to determine if there are potentially interfering signals on any of the narrow channels, the wide channel having a bandwidth of at least 80 MHz;
detecting a potentially interfering signal on a particular narrow channel of the multiple narrow channels; and
transmitting to another device on a reduced wide channel that includes at least some of the narrow channels of the multiple narrow channels and excludes said particular narrow channel.

46. The at least one computer-readable non-transitory storage medium of claim 45, further including instructions which when executed by one or more processors result in performing operations comprising monitoring each of the narrow channels of the multiple narrow channels.

47. The at least one computer-readable non-transitory storage medium of claim 45, further including instructions which when executed by one or more processors result in performing operations comprising:
stopping a monitoring of the particular narrow channel of the multiple narrow channels, while continuing to monitor the at least some of the multiple narrow channels, for a particular period of time; and
resuming a monitoring the multiple narrow channels after expiration of the particular period of time.

48. The at least one computer-readable non-transitory storage medium of claim 47, wherein the particular period of time is to be selected from a list consisting of:
a network allocation vector; and
a transmit opportunity.

49. The at least one computer-readable non-transitory storage medium of claim 45, further comprising instructions which when executed by one or more processors result in performing operations comprising:
receiving a request-to-send (RTS) from the second device, the RTS including information regarding the wide channel; and
transmitting a clear-to-send (CTS) to the second device in response to the RTS, the CTS including information regarding the reduced wide channel.

50. The at least one computer-readable non-transitory storage medium of claim 45, wherein the wide channel includes eight 20 MHz narrow channels.

51. The at least one computer-readable non-transitory storage medium of claim 45, wherein:
   the RTS is received separately and in parallel on each of the multiple narrow channels of the wide channel; and
   the CTS is transmitted separately and in parallel on each of the narrow channels of the reduced wide channel.

52. The at least one computer-readable non-transitory storage medium of claim 45, wherein the wide channel includes narrow channels that are not contiguous.

* * * * *